United States Patent [19]

Gould

[11] Patent Number: 4,657,771
[45] Date of Patent: Apr. 14, 1987

[54] METHOD FOR KNEADING FOOD PIECES

[75] Inventor: Bruce M. Gould, Fullerton, Calif.

[73] Assignee: Challenge-Cook Brothers, Inc., City of Industry, Calif.

[21] Appl. No.: 707,506

[22] Filed: Mar. 4, 1985

Related U.S. Application Data

[60] Division of Ser. No. 605,990, May 2, 1984, Pat. No. 4,517,888, which is a continuation of Ser. No. 196,875, Oct. 14, 1980, abandoned.

[51] Int. Cl.$^4$ .................... A22C 5/00; A23P 1/00
[52] U.S. Cl. .................... 426/641; 426/519
[58] Field of Search .............. 99/472, 516, 534, 536, 99/535; 366/57, 58, 59, 135, 139, 163, 191, 225, 227, 228, 233; 220/244, 260, 314; 34/92; 69/30; 426/641, 513, 519, 281

[56] References Cited

U.S. PATENT DOCUMENTS

| | | | |
|---|---|---|---|
| 2,629,311 | 2/1953 | Graves | 426/281 X |
| 3,161,403 | 12/1964 | Lincoln et al. | 426/519 X |
| 3,175,811 | 3/1965 | Jackson . | |
| 3,518,849 | 7/1970 | Eggleston . | |
| 3,665,735 | 5/1972 | Brennan | 69/30 |
| 3,746,316 | 7/1973 | Lange et al. . | |
| 3,803,882 | 4/1974 | Brennan . | |
| 3,880,067 | 4/1975 | Hoffman . | |
| 3,934,860 | 1/1976 | Michels et al. | 99/535 X |
| 4,029,824 | 6/1977 | Langen | 426/281 |
| 4,036,122 | 7/1977 | Langen . | |
| 4,038,426 | 7/1977 | Jespersen et al. | 426/281 X |
| 4,120,981 | 10/1978 | Burkhart . | |
| 4,173,925 | 11/1979 | Leon . | |
| 4,214,518 | 7/1980 | Petsche | 99/535 |
| 4,229,458 | 10/1980 | Dreano et al. | 426/281 X |

FOREIGN PATENT DOCUMENTS

| | | |
|---|---|---|
| 175478 | 10/1978 | Fed. Rep. of Germany . |
| 2720732 | 10/1978 | Fed. Rep. of Germany . |
| 2814881 | 2/1979 | Fed. Rep. of Germany . |
| 311210 | 3/1979 | Fed. Rep. of Germany . |
| 2460113 | 2/1981 | France ........................ 99/535 |
| 405305 | 5/1972 | United Kingdom . |
| 1488082 | 10/1977 | United Kingdom . |

*Primary Examiner*—Arthur L. Corbin
*Attorney, Agent, or Firm*—Lyon & Lyon

[57] ABSTRACT

Apparatus and process for kneading food pieces includes a rotatable drum mounted on an inclined axis. There are spiral flights along the side wall of the drum. Charging and discharging the drum is effected through an open end and the drum includes a door for airtight sealing of the drum. A vacuum can be drawn inside the drum for different types of food processing. The processor can be used for blending constituents for food products. The kneading action can be applied to massaging or tumbling meat chunks, and treatment liquids can be added to the drum and/or the food pieces for processing.

30 Claims, 8 Drawing Figures

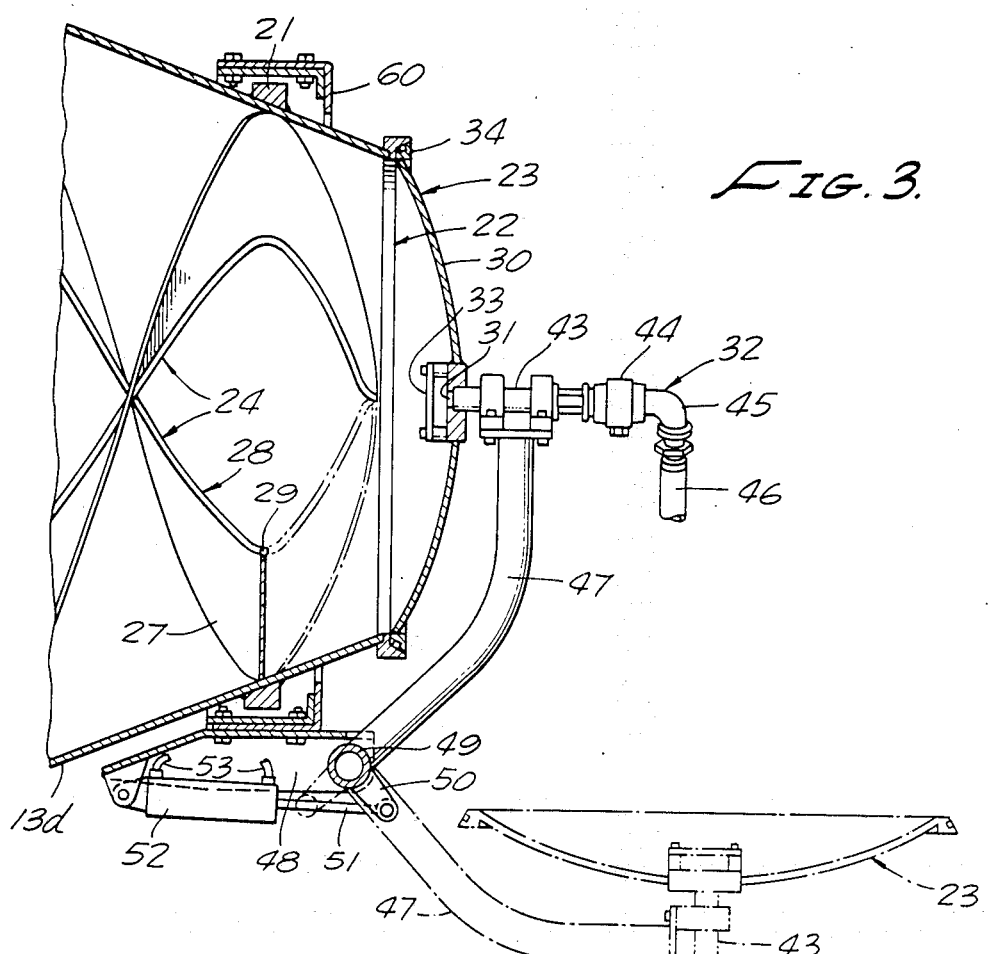
FIG. 3.
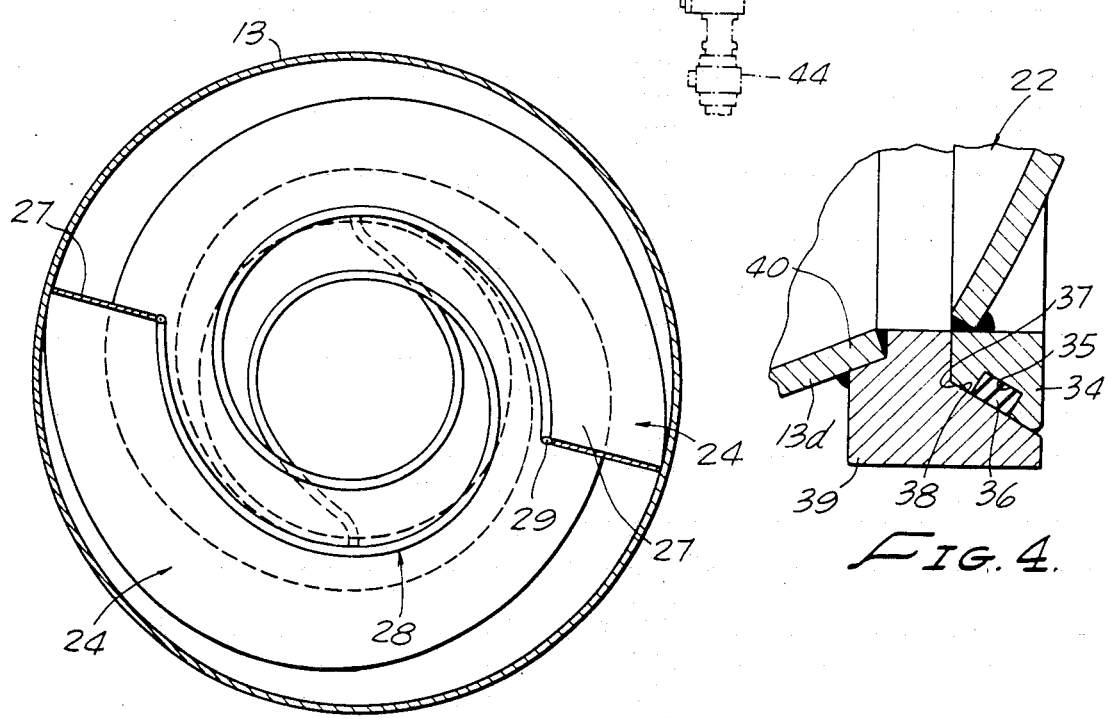
FIG. 4.
FIG. 5.

METHOD FOR KNEADING FOOD PIECES

BACKGROUND OF THE INVENTION

This is a division of application Ser. No. 605,990, filed May 2, 1984, U.S. Pat. No. 4,517,888, which was in turn a continuation of application Ser. No. 196,875, filed Oct. 14, 1980, now abandoned.

This invention relates to processing food and products for food. In particular, the invention is directed to the kneading of a multiplicity of substantially integral food pieces, for instance, chunks of meat, fruits or cheese wheels or the like.

The prior art of such food processing is described with reference to the massaging and tumbling of chunks of meat, and in this regard the meat products are, for example, cured hams, ham products, bacon bellies, corn beef briskets, or fresh meats, such as, meat beef rounds, roasts, turkey breasts, or other poultry products. Such meats have been subjected to a tumbling or massaging in various kinds of known apparatus.

Cured meat products are normally needle injected with a curing brine prior to mechanical tumbling or massaging at atmospheric pressure, or alternatively under a vacuum. The purpose of tumbling and massaging is to accelerate the curing process, improve distribution of the curing ingredient and to extract the "bind" protein myosin.

The extraction of myosin results in a sticky or tacky meat surface which improves moisture absorbtion and retention and enhances product coherency during processing.

Massaging bondless hams can improve and accelerate the distribution of injected curing brine resulting in a better cure in less time and most importantly, the yield of the ham after cooking is increased by 5% to 7%. Tumbling of beef rounds or turkey breasts results in a condition that permits several pieces to be stuffed in casings or placed in molds for precooking. After chilling, the agglomerated meat can be thinly sliced without falling apart. Tumbling or massaging also results in other benefits such as improving uniformity of color, tenderness, pliability, control of shrinkage, and reduced cooking losses.

Generally, pale, soft meat such as pork and chicken is massaged while dark, firm meat such as beef, mutton and turkey is tumbled. Tumbling involves the result of "impact energy" influences on muscle such as would occur in allowing meat to fall from the upper part of a rotating drum, or striking it with paddles or baffles. Massaging is a less physically vigorous process and involves "frictional energy" resulting from the rubbing of one meat surface on another, or on a smooth surface of a container.

Known apparatus for this massage processing includes vertical paddle massagers which are shown in U.S. Pat. No. 4,038,426 (Jespersen) and U.S. Pat. No. 3,934,860 (Michels). In such vertical paddle massaging, the paddles are suspended from above to engage the product, and the units may be portable and transportable from the brine injector lines to a process area. Unloading of the tanks is accomplished by tipping the entire unit with hydraulically actuated dumpers. Such paddle massagers are not suitable for bone-in ham due to product damage and are used almost exclusively for boneless ham production. Even for such bondless products, the rotating paddles or stirring blades drag products through the mass of the load. This results in the tearing away and separation of pieces from the main chunks.

Vacuum massagers are basically of two kinds. One incorporates a drum or barrel shaped vessel which rotates in a horizontal position on powered rollers. Such a unit is internally equipped with longitudinal or angularly rotated shelves to effect lifting and mixing. The drum is loaded from the top while in a vertical position and then tilted down 90° for tumbling on rollers. Such massagers require considerable labor for loading and unloading. An example of such an arrangement is shown in U.S. Pat. No. 3,880,067 (Hoffman).

The second kind of vacuum massager is of the sort illustrated in U.S. Pat. Nos. 4,029,824 (Langen), 4,036,122 (Langen), and 3,746,316 (Langen). This system involves an elaborate "Y" configuration vessel with one leg of the "Y" detachable. The drum rotates about a central axis to allow the meat to tumble under the vacuum from one chamber to the next. This system usually involves several detachable chambers or round stainless steel meat tubs mounted on wheels which are used as product collection and transportation containers. Food containers are attached to a conveyor system for indexing to the "Y" drum area. Brine injector heads equipped with a pattern of injection needles may be provided in the two permanent chambers. Because of the height from which the chunks of meat fall from chamber to chamber, damage in the sense of bruising the meat occurs. Where injector needles are employed, tearing or shredding of the muscle is additionally caused.

In the prior art of tumblers, it is known to provide atmospheric pressure tumblers which are horizontal drums, conical at each end and equipped with a manually operated door. Internal horizontal shelves effect the necessary lifting of the product. Such tumblers are used primarily for extracting the bind protein myosin in the preparation of precooked sectioned and formed beef products.

Vacuum tumblers incorporate a horizontal drum running on powered rollers and function much like a laundry tumbler in that it tilts to discharge. The product is loaded through a fold-away chute located at the drum center. The chute is pivoted out of the way and a vacuum door is placed over the charging opening during processing.

There are various other devices designed for other purposes that may have been used or tried by the meat processing industry from time to time, such as ribbon blenders employing helical paddles mounted on and rotated by a central shaft in a cylinder that are used in the chemical industry and small tilting drum-type concrete mixers, but insofar as can be determined, none of such devices has been considered satisfactory or successful, since they have not been adopted.

In the field of kneading food pieces and in view of the above limitations and disadvantages of the prior art, there is a need to provide a means for and method of food processing which can provide a gentle low speed rolling or massaging action on the food pieces.

In particular, with the processing of meat it is necessary to minimize bruising of the product and situations where static load conditions can cause tearoffs or separation. Also in regard to the vacuum tumbling or massaging of meat there is also the need to produce high quality meat products whch are uniform in cure, bright in color, free of bruises with the entire meat structure intact and dense in mess.

Furthermore, there is a need for a single high productivity meat massager which permits for prompt processing of slaughtered animals, thereby to minimize the time during which muscles contract and rigor mortis sets in. There is thus a need for a massager which requires less down time during which the curing brine would only penetrate through osmosis.

There is also a need for a processor which can operate both as a massager and a tumbler, and the prior art discloses units which are either only tumblers or massagers. In such a composite unit there is therefore the requirement for slow speed massaging and a higher speed dynamic tumbling where a requisite amount of physical abrasion is desirable.

Additional needs include those of a reduced capital cost, power, and handling requirements, working space and maintenance. It is also desirable to have a processor which is substantially more self-cleaning than existing processors.

SUMMARY OF INVENTION

Apparatus and method for kneading a multiplicity of substantially integral food pieces including a rotatable drum having spiralling flight means mounted about the inside wall between a closed end and an open end of the drum in which, upon rotation of the drum, the food pieces are kneaded by contact with each other, with the type and magnitude of the kneading action being variable by changes in drum speed and direction of rotation. A further improvement includes door means provided on the open end of the drum, and, in some preferred forms of the invention, a means for drawing a vacuum in the drum during processing.

The invention also has application to various requirements in the processing of food products such as the blending of different constituents for a final food product.

BRIEF DESCRIPTION OF THE DRAWINGS

FIG. 3 is a partial sectional side view showing details of the door means and also illustrating, in phantom lines, the door means in an open position, FIG. 4 is a detailed sectional side view showing the engagement reinforcing flange of the door means with the engagement reinforcing flange about the open end of the drum, FIG. 5 is a sectional end view through the drum along line 5—5 of FIG. 1 in the direction towards the open end of the drum, FIG. 8 is a detailed sectional side view showing the hatch means in the side wall of the drum.

DETAILED DESCRIPTION

Figure 1:
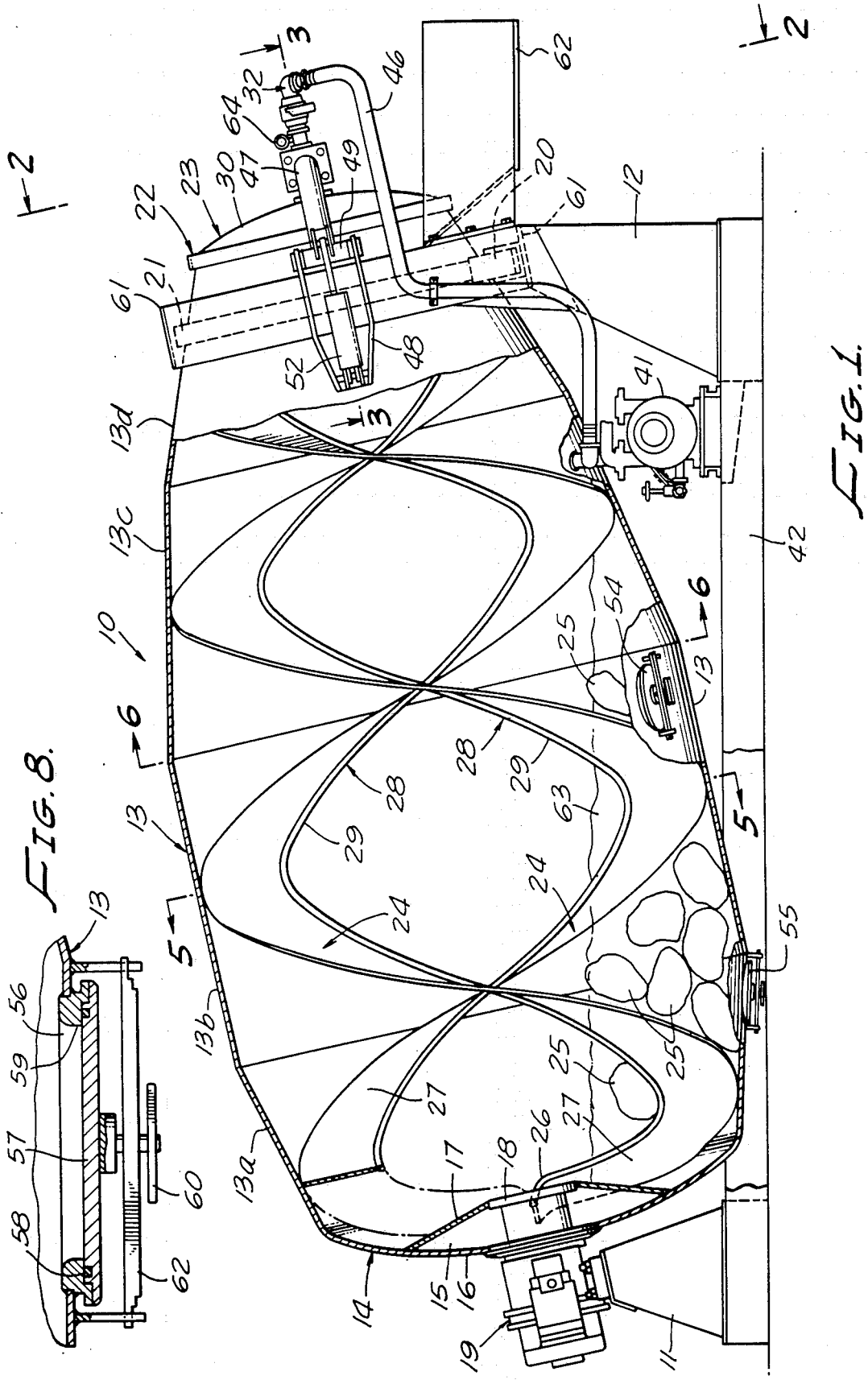
FIG. 1 is a side view of the apparatus showing the drum partly in section.
Figure 2:
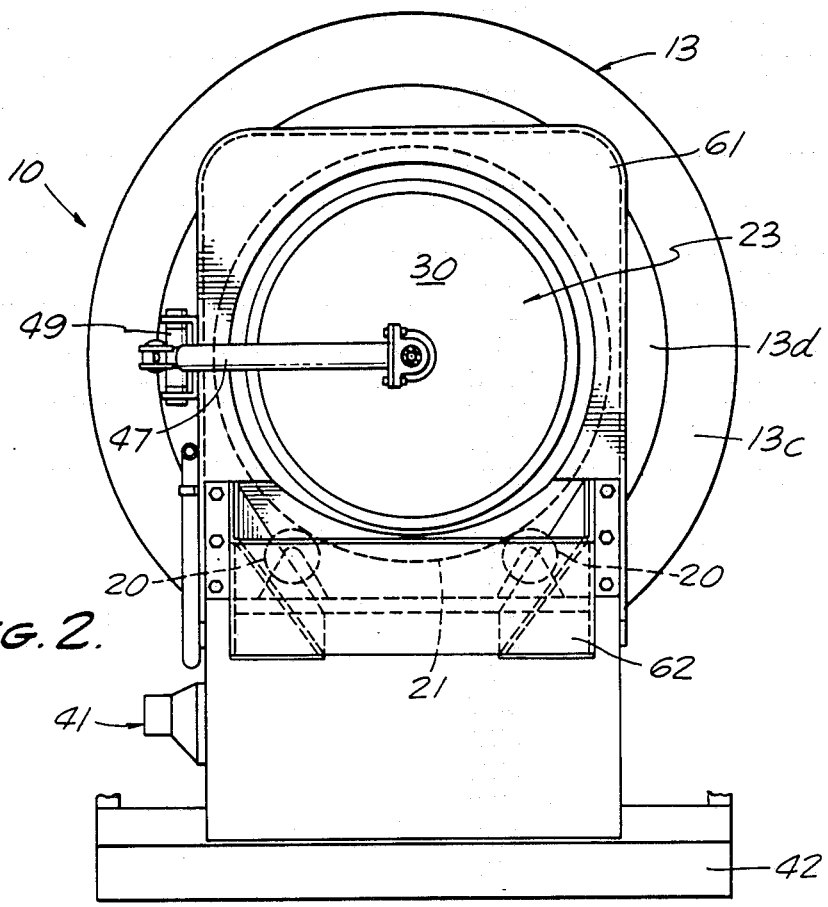
FIG. 2 is an end view along line 2—2 of FIG. 1 showing the drum from the open end with the door means closed on the end.
Figure 6:
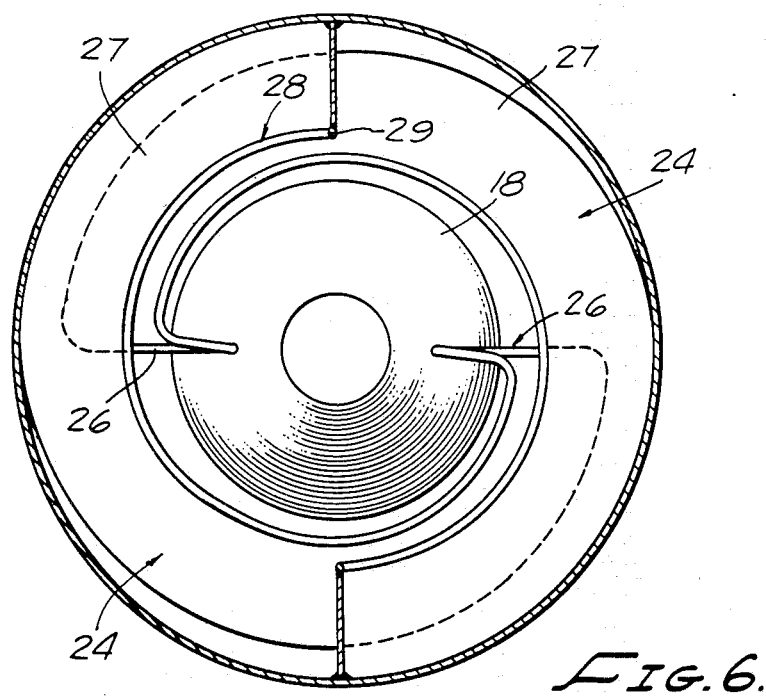
FIG. 6 is a sectional end view through the drum along line 6—6 of FIG. 1 in a direction toward the closed end of the drum.
Figure 7:
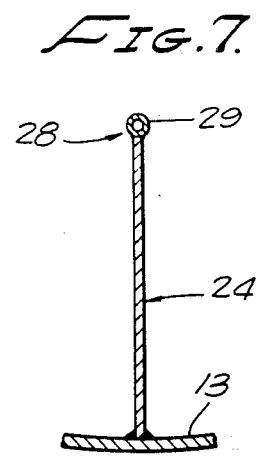
FIG. 7 is a detailed sectional end view through a vane of the flight means in the drum, and showing the connection of the vane to the side wall of the drum.

The apparatus of this invention for kneading a multiplicity of substantially integral food pieces, such as chunks of meat, includes a rotatable drum 10 of stainless steel and having a glass bead blasted finish mounted on an axis inclined to the horizontal and suported by pedestals 11 and 12. The drum includes a side wall 13 made up of four segments 13a, 13b, 13c and 13d so that segment 13a tapers away from a closed end 14 to a larger diameter about the central section 13b and thereafter tapers at segments 13c and 13d gradually towards a smaller diameter at an open end of the drum 10. The closed end 14 of the drum 10 includes a centrally located internal conical housing 15. This housing 15 is formed by a portion 16 of end wall 14, a conical internal wall 17, and central circular segment 18 inside the drum 10. The conical housing 15 defines an area through which a relatively conventional direct hydrostatic drive means 19 can be drivingly coupled to the closed end 14 of drum 10. The hydrostatic drive 19 is itself mounted on the pedestal 11 and thereby effects the drum mounting support axially at the closed end 14 of the drum 10.

Pedestal 12 is located about the side wall 13 remotely from the closed end 14 and thereby provides an additional mounting to the drum 10. On top of pedestal 12 there are rollers 20 on which a track 21 on the side wall 13d of the drum is adapted to run. In this manner, the drum is rotatable about its longitudinal axis which is inclined to the horizontal in a range between about 10° to 15°, preferably 12°.

The drum 10 provides an open end 22 which is closed by door means 23 as may be required in operation of the drum 10. The flight means are mounted on the inside of the side wall 13 and extend substantially over the length of the drum 10 between the closed end 14 and the open end 22. The flight means are defined by two spiralling vanes 24 which are 180° out of phase with each other and are mounted about the inside of the side wall 13 of the drum 10. The lead angle of the vane 24 is designed relative to the side wall segments 13a, 13b, 13c, and 13d such that upon rotation in a first direction the food pieces or food product 25 within the drum 10 are urged towards the closed end 14 of drum 10. Rotation in the opposite direction causes the contents 25 to be urged toward open end 22 and, when the door means 23 is opened, to be discharged through the open end 22 of drum 10. The lead angle in the central areas 13b and 13c of the drum 10 is about 26° and is somewhat less at the discharge section 13d of the side wall 13 due to the decreasing diameters of the side wall 13.

Vanes 24 meet the conical wall 17 at the closed end 14 substantially at right angles, and this is achieved by providing lips 26 substantially right angularly directed relative to the normal planar section 27 of the vanes 24. Such right angular engagement of the vanes 24 and wall 17 ensures that food pieces 25 do not wedge in a narrowing tight angle which would otherwise be formed if the vane sections 27 gradually tapered into engagement with the conical wall 17.

The edge 28 of vanes 24 provides a thickened cross-section 29 so as to minimize deleterious action on the food pieces during operation of drum 10. Such action could be the bruising of chunks of meat, or unwanted severage of pieces of meat from the greater pieces 25. The thickened cross-section 29 is formed by welding a tubular pipe section 29 on top of the plate forming the vanes 24.

The door means 23 is defined by a dish-shaped plate 30. Centrally through the plate 30 there is provided a port 31 which is connected with a pipe 32. Between the port 31 and the interior of drum 10 there is provided a strainer 33 which prevents the passage of particles of food pieces into the port 31 and pipe 32. About the dish 30, there is a circular reinforcing flange 34 which is provided with a circular slot 35 in which is located a sealing ring 36. The flange 34 provides a tapered edge 37 relative to the plane of the dish 30 which is arranged to abut with a tapered edge 38 formed in a circular reinforcing flange which is welded to the segment 13d at its end 40, namely the open end 22 of the drum 10. The mating tapered edges 37 and 38 facilitate self-aligning of the door means 23 with the open end 22 such that an air-tight seal can be created together with sealing ring 36 engaging with the tapered edge 38 as shown.

In the side wall 13 of the drum 10, there are two hatch means 54 and 55. The hatch means are offset from each other in a lateral and longitudinal direction. Each hatch means 54 and 55 includes an opening 56 in the a side wall 13, and a cover 57 which is arranged to move into and from engagement in an axial direction with the opening 56 such that effective sealing of the openings 56 can be made. A sealing ring 58 abuts with the mouth 59 around opening 56. Handle 60, and transverse bar 62 effectively provide for operation of the covers 57.

About the open end 22 to drum 10 there is a mounted shield 61 which covers the mounting rollers 20 and track 21 and effectively screens the opening 22 from those portions of the drum and drive mechanisms 19 and 14 rearwards of the shield 61 in the direction towards the closed end 14 of the drum 10. Affixed to the shield 61 is a delivery hopper 62 so that food pieces 25 discharged from the drum 10 can be fed suitably to a removal means.

A vacuum can be drawn in the inside of drum 10 through pipe 32 by means of a vacuum pump 41 which is mounted on the framework 42 below the drum 10. Generally, pipe 32 is defined by a lead section 43 which is connected with the port 31 and rotating union 44, and elbow 45 connected with flexible vacuum tubing 46 or the like. A valve can be provided in the pipe 32 at any suitable place so that the vacuum pump 41 and drum 10 can be isolated from or connected with each other as desirable. In some cases the union 44 may be removed and, after a suitable vacuum is drawn through the pipe 32, the valve is closed. The vacuum pump 41 is thus isolated from the door means 23 and drum 10.

The door means 23 is connected with an arm 47 projecting from and about the lead section 43 of pipe 32 to a mounting 48 laterally spaced from the side wall 12 of the drum 10. The mounting 48 of projecting arm 47 forms a hinge 49 about which the door means 23 is movable. By having the hinge 49 remote from the dish-shaped plate 30, there is sufficient flexibility permitted to the door means 23 such that the self-alignment of the door means 23 with the open end 22 is facilitated. From the mounting 48 there is a stub 50 which is connected with a piston rod 51 which passes into cylinder 52. Such a piston and cylinder means can be pneumatically driven through the supply pipes 53 to open and close the door means 23 as required. In operation of the processing apparatus the door means 23 is open and chunks of meat 25 are fed into drum 10. If desired, a curing fluid or the like 63 is also introduced into the drum to a requisite level. Alternatively the curing fluid 63 can be injected into the meat chunks 25 prior to loading into the drum 10.

Door 23 is then closed and the drum is rotated in a first direction cuasing a general force in a direction towards the closed end 14. This acts to massage the meat chunks 25 until the desired properties and characteristics of the meat chunks 25 are obtained. As required, the drum can also be rotated in a reverse direction and, in this event, with the door closed a different and opposite force is applied to the meat chunks 25, thereby imparting different properties to the meat chunks. In some processes, the drum can be retained stationary for desired time periods so as to impart other requisite characteristics to the food pieces 25 in the drum 10.

Discharge of the meat chunks 25 is effected by opening the door 23 and rotating the drum 10 in the appropriate direction such that the meat chunks 25 are drawn upwardly towards the open end 22 from where they fall into the delivery hopper 62 and are removed.

In another application of the invention when the door 23 is closed a suitable vacuum is applied to the drum, which could be up to about one atmosphere, by activating the vacuum pump 41. A pressure gauge 64 measures the vacuum within the drum 10. With the rotary union 44, the vacuum pump 41 is retained connected to the drum 10. In other cases, the vacuum tubing 46 can be disconnected from the door means 23. The vacuum acts to enhance the properties imparted to the meat chunks 25 and also increases the speed with such improved properties can be imparted to the meat. For different processes, different degrees of vacuum and pressure can be imparted to the drum 10.

In a particular example of the processor of the invention for massaging bone-in and boneless meat products, pieces weighing between 49 lbs. to 57 lbs. per cubic foot would be introduced into the drum 10. The pieces 25 are injected with up to 40% curing brine 63. Aside from the seepage of injected brine and a minor amount of free brine, there would be little float present in the load. During massaging all of the free moisture would be absorbed by the meat 25. Upon completion of the process, the load would be more viscous, yet, remain slippery and easy to handle.

The apparatus can be used for the kneading and processing of other food pieces. In this regard, examples are massaging of citrus products whereby the fruit is softened prior to squeezing or pulping. Likewise, the massaging of cheese wheels to effect homogeneous conditions within the cheese is another process. There are also applications for the blending of food products and various components for food products in the apparatus.

Inspection of the contents of the drum 10 is made possible through the hatch means 54 and 55. By having the hatches 54 and 55 displaced on the drum 10 as indicated, inspection of different areas within the drum is possible. The hatch means also facilitate flushing of the drum during cleansing. In the cleansing operation, a cleansing fluid is added to the drum, the hatch means 54 and 55 are closed as is the door 23, and the drum is rotated in either or both directions so as to effect a suitable cleansing action. Thereafter, flushing and draining is effected through the hatch means 54 and 55. or through the open end 22 when the drum 10 is rotated in reverse.

By having the ring 36 mounted in the flange 34 of the door means 23 it is possible to remove the ring 36 simply so as to facilitate the cleansing of the slot 35, and thus enhances the sanitation associated with the apparatus.

A suitable delivery hopper is provided on casters for feeding food pieces 25 such as meat chunks into the drum 10 and in this connection it is desirable that the delivery hopper have a chute which enters the open end 22 of the drum 10. This avoids spillage of liquid which has a high protein content and this can also avoid a loss in the final yield of the product.

The vacuum pump 41 can be mounted separately from the framework 42 in other embodiments of the invention. Automatic programmed operation of the vacuum pump 41 and hydrostatic drive 19 can be arranged so that preferred operation cycles of processing can be followed.

Advantages of the apparatus include the feature that the structure permits for the increased productivity with less equipment than prior art apparatus necessary for such productivity. For instance, one unit of the invention with a 15,000 lb. capacity is equivalent to nine vertical paddle massagers of 1,700 lb. each. Whereas the unit of this invention operating under vacuum requires only a 6 to 7-hour cycle time, the vertical paddle would require three times as much time for the same massaged end product. Similarly, a vacuum tumbler system of the Langen kind referred to in the prior art above would require two systems to equal the same production output.

Under atmospheric pressure, massaging occurs over a period of about 18 to 24 hours. The speed of rotation during massaging is normally about 2 to 4 rpm. Preliminary tests with the invention have indicated that a fast massaging of meat chunks is possible at a speed of about 10 rpm without causing deleterious effects to the product.

The invented apparatus, operating on a gentle low speed rolling action or at the higher speed massaging, effectively provides a superior product with minimized damage, whether operating under vacuum or at atmosphere.

Furthermore, the massager can also tumble meat or other food pieces at atmosphere or under vacuum, at a speed up to 12 rpm and this versatility and multiple application of the invention is an additional important advantage and contribution of the invention in the art of food processors.

Initial captital costs are substantially reduced with the present invention as is the operating labor and expenses. The costs and labor for cleansing the apparatus are reduced and this can be effected at a rotational speed of about 10–12 rpm.

In different embodiments of the invention it is possible to have the lead angle of the vane 24 in the central areas 13b and 13c of the drum 10 in a range between 20° and 45°. It apears that the most desirable is in the vicinity of 25° to 30°. One factor which will determine the desirable lead angle is the angle of inclination of the drum to the horizontal, which is also variable according to specific product requirements.

In yet a different form of the invention it is possible to have the hatch means 54 and 55 only longitudinally or only laterally offset from each other. The hatch means 54 and 55 can be in a single section 13a, 13b, 13c, or 13d of the side wall 13, and the hatch means can be midway between the vanes 24 of the flight means.

In place of the piston 51 and cylinder 52 being pneumatically operated, the door means 23 can be hydraulically operated or any other suitable actuator can be used.

In yet a further embodiment of the invention a different sealing arrangement between the door 23 and open end 22 is provided. The door 23 is arranged with a face, rather than a flange 34, which engages the perimeter of the open end 22, and between the face and perimeter there is a sealing 36.

As a preferred embodiment of the present invention has been described and illustrated in detail, those skilled in the art will readily appreciate that various modifications can be made without departing from the spirit of the present invention. Accordingly, the scope of the invention is to be limited only by the appended claims.

I claim:

1. A method of kneading a multiplicity of integral food pieces comprising:
    (a) feeding the food pieces into a rotatable drum having a sidewall, a closed end to the drum, and an opened end, the opened end being opposite the closed end, the drum being mounted at an inclined axis and having a spiralling flight means mounted on the inside of the sidewall of the drum and extending over substantially the length between the closed end and the opened end of the drum;
    (b) rotating the drum in a first direction about the axis whereby the food pieces contact each other, the rotation of the drum and the action of the flight means tending to draw the food pieces inwardly into the drum and causing continuous movement of substantially all the food pieces throughout the drum; and then
    (c) reversing the direction of the rotation of the drum to a second direction opposite from the first direction thereby to discharge food pieces from the drum under the action of the spiralling flight means.

2. The method as claimed in claim 1 including adding a treating liquid to the food pieces.

3. The method as claimed in either claim 1 or claim 2 including closing the drum during rotation in the first direction and drawing a vacuum in the drum during drum rotation.

4. The method as claimed in claim 3 including closing the drum during rotation in the second direction.

5. A method as claimed in claim 4 wherein the food pieces are meat chunks.

6. The method as claimed in claim 3 including alternately rotating the drum in the first direction and the second direction, and retaining the drum stationary for predetermined time periods.

7. A method as claimed in claim 6 wherein the food pieces are meat chunks.

8. A method as claimed in claim 3 wherein the food pieces are meat chunks.

9. The method as claimed in either claim 1 or claim 2 including alternately rotating the drum in the first direction and the second direction, and retaining the drum stationary for predetermined time periods.

10. A method of processing food or constituents for a food product in an inclined rotatable drum having a sidewall, a closed end to the drum, and an opened end, the opened end being opposite the closed end, the drum having flight means spiralling therein and mounted on the inside of the sidewall of the drum and extending over substantially the length between the opened end and the closed end of the drum, comprising:
    a. feeding the ingredients of the food product into the drum;
    b. closing the opened end of the drum with door means;
    c. rotating the drum in a first direction and a second direction, or retaining the drum stationary for desired time intervals, thereby to impart different actions to the food products;

d. opening the door after a predetermined time interval, and then;

e. rotating the drum in the second direction opposite to the first direction whereby the flight means discharges the food product.

11. A method as claimed in claim 10 including drawing a vacuum in the drum during drum rotation.

12. A method of kneading a multiplicity of integral food pieces, comprising:

a. feeding the integral feed pieces into a rotatable drum mounted at an inclined axis and having an interiorly located spiralling flight means extending over substantially the length of the drum, said drum having a closed end and an opened end, and said drum and said flight means providing a structural surface without sharpened features or edges, whereby the integral food pieces are not subject to substantial separation or other deleterious action during movement within the drum;

b. rotating the drum in a first direction about the axis causing the integral food pieces to be continually forced to move within the drum towards the closed end and relative to the other integral food pieces by the movement of the spiralling flight means through the multiplicity of food pieces during rotation, whereby the integral food pieces are kneaded by contact with each other during said movement within the drum; and then c. reversing the direction of the rotation of the drum so that the integral food pieces are drawn generally to said opened end of the drum thereby to discharge said integral food pieces from the drum.

13. The method according to claim 12 in which said spiralling flight means are imperforate and include a thickened cross-section thereby to minimize deleterious action of the spiralling flight means on the integral food pieces.

14. The method according to claim 13 including adding a treating liquid to the integral food pieces.

15. The method according to claim 12 in which said spiralling flight means meets the closed end of the drum at an angle for inhibiting a wedging of integral food pieces between the closed end and the spiralling flight means.

16. The method according to claim 15 in which said spiralling flight means are imperforate and include a thickened cross-section thereby to minimize deleterious action of the spiralling flight means on the integral food pieces.

17. The method according to claim 16 including adding a treating liquid to the integral food pieces.

18. The method according to claim 15 including adding a treating liquid to the integral food pieces.

19. The method according to claim 12 including adding a treating liquid to the integral food pieces.

20. The method according to claims 12, 13, 15, 16, 19, 14, 18 or 17 including closing the drum with door means during rotation in the first direction and drawing a vacuum in the drum during drum rotation.

21. The method according to claim 20 incluing closing the drum with door means during rotation in a second direction opposite to the first direction and rotating the drum in the second direction.

22. The method according to claim 21 including alternately rotating the drum with door means in the first direction and the second direction, and retaining the drum stationary for predetermined time periods.

23. The method according to claim 22 in which the integral food pieces are meat chunks.

24. The method according to claim 12, 13, 15, 16, 19, 14, 18 or 17 including closing the drum with door means during rotation in a second direction opposite to the first direction, and rotating the drum in the second direction.

25. The method according to claim 24 including alternately rotating the drum in the first direction and the second direction, and retaining the drum stationary for a predetermined time period.

26. The method according to claim 25 in which the integral food pieces are meat chunks.

27. A method of kneading a multiplicity of integral food pieces comprising:

a. feeding the integral food pieces into a rotatable drum mounted at an inclined axis and having an interiorly disposed spiralling flight means extending over substantially the length of the drum, said drum having a closed end and an open end, said spiralling flight means being imperforate and including a thickened cross-section thereby to minimize deleterious action of the spiralling flight means on the food pieces, said spiralling flight means also meeting the closed end of said drum at an angle for inhibiting a wedging of integral food pieces between the closed end and the spiralling flight means, and said drum and said spiralling flight means providing a structural surface without sharpened features or edges, whereby the integral food pieces are not subject to substantial separation, cutting or other deleterious action during movement within the drum;

b. adding a treating liquid to the integral food pieces;

c. closing the open end of the drum with door means prior to rotation;

d. rotating the drum in a first direction about the axis causing the integral food pieces to be continually forced to move within the drum towards the closed end and relative to the other integral food pieces by the movement of the spiralling flight means through the multiplicity of food pieces during rotation, whereby the integral food pieces are kneaded by contact with each other during said movement within the drum;

e. rotating the drum in a second direction opposite to the first direction whereby kneading of the food pieces is achieved as in step d;

f. retaining the drum stationary for predetermined times;

g. opening the drum; and then h. rotating the drum in a second direction so that the integral food pieces are drawn generally to the open end of the drum thereby to discharge the integral food pieces from the drum.

28. The method according to claim 27 including drawing a vacuum in the drum after the step of closing the open end of the drum with door means.

29. The method according to claim 27 or 28 wherein the integral food pieces are meat chunks.

30. A method of blending food products, comprising:

a. feeding the food products into a rotatable drum having a sidewall, a closed end, and an opened end, the opened end being opposite the closed end, the drum being mounted at an inclined axis and having spiralling flight means mounted on the inside of the sidewall of the drum and extending over substantially the length between the closed end and the open end of the drum;

b. rotating the drum in a first direction about the axis causing the food products to be continually forced to move within the drum towards the closed end whereby the food products are blended; and then c. reversing the direction of the rotation of the drum so that the blended food products are drawn generally to an open end of said drum thereby to discharge the blended food products from the drum.

* * * * *